United States Patent Office 3,646,230
Patented Feb. 29, 1972

3,646,230
HYDROFLUORINATION OF ACETYLENIC UNSATURATES TO PRODUCE OLEFIN FLUORIDES
Frederick E. Kung, Akron, Ohio, assignor to PPG Industries, Inc., Pittsburgh, Pa.
No Drawing. Continuation of application Ser. No. 591,078, Nov. 1, 1966. This application Feb. 26, 1969, Ser. No. 802,646
Int. Cl. C07c 17/08, 21/18, 25/14
U.S. Cl. 260—653.4         7 Claims

ABSTRACT OF THE DISCLOSURE

Olefinically unsaturated fluorides, such as vinyl fluoride, are prepared by catalytically reacting equimolar proportions of an acetylenically unsaturated compound and hydrogen fluoride in a liquid medium containing an inert fluoride salt as an essential component. Mercury catalysts are used.

RELATED APPLICATIONS

This application is a continuation of my application Ser. Ser. No. 591,078 filed Nov. 1, 1966 now abandoned.

This invention deals with olefinically unsaturated fluorides exemplified by vinyl fluoride. More particularly, it concerns preparation of such fluorides by hydrofluorination of an appropriate acetylenic precursor.

Vinyl fluoride can be prepared by vapor phase hydrofluorination of acetylene, usually with recourse to appropriate catalysts, mercury compounds being among those which are frequently suggested in the literature. Generally, such vapor phase hydrofluoroinations suffer from considerable formation of coproduct, such as ethylidene fluoride. They additionally encounter limited catalyst life, i.e., catalyst activity declines in a relatively brief period.

According to the present invention, olefinically unsaturated fluorides such as vinyl fluoride, 2-fluoropropene and the like are produced by the hydrofluorination of an alkyne such as acetylene with hydrogen fluoride in a liquid reaction medium. Thus, this invention is directed to a novel advantageous process in which alkynes typified by acetylene and hydrogen fluoride are combined in a liquid medium of a fluoride salt and under the catalytic influence of mercury compounds to provide (usually with substantial exclusively) the equimolar hydrofluorination product, e.g., vinyl fluoride. High yields and conversions, little or no by-product, good catalyst productivity, convenient operating conditions as well as other desirable features characterize the ends attainable by virtue of this invention.

An especially important feature of this invention is the establishment of an appropriate liquid medium in which to effect the hydrofluorination, i.e., the formation of olefinically unsaturated fluoride. This liquid medium contains as an essential critical component a fluoride salt. As will hereinafter be discussed in greater detail, the precise chemical composition and/or nature of the fluoride salt can vary.

Fluoride salts useful for the purpose of this invention are salts of hydrogen fluoride and an inorganic base such as sodium fluoride or an organic base such as dimethylaniline, by way of exemplification.

Other than the reactants, alkylene and hydrogen fluoride, the ideal reaction medium in which to effect the hydrofluorination chemically is principally made up of the fluoride salt, usually along with further hydrogen fluoride. That is, in addition to the hydrogen fluoride supplied for the hydrofluorination, the liquid reaction medium may contain further hydrogen fluoride in liquid state, probably combined with the salts to provide polyfluoride salts in which form the otherwise high vapor pressure of hydrogen fluoride is partially circumvented.

Thus, in some instances, these useful reaction media may be in the form of liquid solutions of hydrogen fluoride and the fluoride salt. In others, hydrogen fluoride is believed to be combined with a fluoride salt. Liquid compositions which result from the co-ordination of hydrogen fluoride with the fluoride ion of the salt serve as effective reaction media. For example, as hereinafter discussed more explicitly, one recommended reaction medium is a liquid system which has a composition corresponding to 6 moles of HF per mole of dimethylaniline.

A further characteristic of the reaction medium is its inertness (except as to its role in connection with the desired hydrofluorination) under the conditions of hydrofluorination to which it is subjected in the forming of vinyl fluoride. Thus, it is preferred that the reaction medium be unreactive with respect to acetylene and hydrogen fluoride (except to accomplish the desired hydrofluorination) to the extent that it will not be responsible for causing undesirable by-products.

One especially useful type of reaction media is provided by organic fluoride salts. Hydrofluoride salts of amines, notably secondary and tertiary amines, including triethylamine, tri-n-heptylamine and triisopropylamine, are especially noteworthy. Especially appropriate are liquid media comprising hydrofluoride salts of the aromatic tertiary amine, dimethylaniline. Other tertiary anilines also are useful including N,N-dialkylanilines such as N-ethyl-N-methylaniline. Primary amines, however, also can be employed and include, by way of illustration, aniline. Heterocyclic amines, to wit, heterocyclic compounds containing a nitrogen ring atom, such as pyridine, piperidine, piperazine, quinoline, methyl morpholine, triethylene diamine, quinuclidine, isoquinoline, quinaldine, and alpha- and beta-picoline, also combine with hydrogen fluoride to provide suitable fluoride salts. Quinoline hydrofluoride or as it sometimes may be called, quinolinium fluoride, is an organic fluoride salt which is particularly useful for the performance of this invention.

According to one preferred manner in which this present invention is performed, quinoline hydrofluoride coupled with from 3 to 9 moles (preferably about 7 moles) of hydrogen fluoride per mole thereof are combined in the provision of an especially effective reaction medium to which acetylene is introduced and from which vinyl fluoride is evolved. Another exemplary reaction medium is provided by a composition corresponding to from 3 to 6, ideally about 5, moles of hydrogen fluoride per mole of dimethylaniline.

Inorganic fluoride salts constituted a further class of useful salts. Such salts are exemplified by alkali metal fluorides, among which are sodium fluoride, lithium fluoride, potassium fluoride and ammonium fluoride. With these inorganic salts, the liquid reaction medium apparently is in the form of a solution of the salt in hydrogen fluoride, i.e., the hydrogen fluoride in effect serves as the solvent.

In performing hydrofluorination pursuant to the present invention, an appropriate liquid reaction medium of fluoride salt is initially established, either by forming the fluoride salt in situ in the reactor or by performing and thereafter charging it to the reactor or reaction zone. For example, a liquid composition is prepared by combining from 2 to 9 moles of hydrogen fluoride per mole of quinoline, dimethylaniline or like organic base and the resulting liquid composition is charged to a reactor. Appropriate catalyst is then distributed in the liquid medium. With such liquid reaction medium present in the reactor, hydrogen fluoride and acetylene (or like alkyne) in substantially equimolecular (stoichiometric) proportions are fed (usually as gases) to the liquid medium, preferably below the liquid level thereof.

Temperature conditions of operation are variable, but primarily from minus 15° C. to 90° C. Although atmospheric or near atmospheric (up to 5 atmospheres absolute) pressure conditions are most commonly utilized, subatmospheric or higher pressures are useful by taking appropriate safety precautions in the handling of acetylene or other alkyne which may also be sensitive to pressure, vinyl fluoride is normally gaseous. Thus, it evolves as a gas from the liquid reaction medium.

With such conditions prevailing and the vinyl fluoride evolving from the reaction medium, the rate and proportion at which acetylene and hydrogen fluoride are fed thereto typically are proportioned such that a relatively steady state reaction composition is maintained by taking into account the rate of vinyl fluoride and hydrogen fluoride evolution from the reaction medium. This mode of operation is the recommended manner of practicing this invention since best results have been realized following procedures in which a specific ratio of HF to base in the liquid is maintained as against having the medium become leaner in HF.

It nonetheless is possible to operate under what is more akin to batch conditions than continuous conditions. For example, after the liquid reaction medium of a hydrofluoride base salt such as quinoline hydrofluoride with hydrogen fluoride is established, acetylene alone may be fed to that liquid medium to form vinyl fluoride with the hydrogen fluoride in the liquid composition. Formation of vinyl fluoride in such a procedure continues, however, so long as hydrogen fluoride remains available for reaction in the liquid composition.

Conditions of operation should in preferred practice be such that the fluoride product, e.g., vinyl fluoride, evolves as a gas from the reaction medium. Obviously desirable is that the gases which evolve be as rich as possible in product. To this end, conditions are, such as adequate retention time for the reagents, for the purpose of realizing essentially complete hydrofluorination of the feed alkyne. This entails feeding adequate hydrogen fluoride (about one mole per mole of alkyne plus an amount of hydrogen fluoride to replace any hydrogen fluoride which is swept out) and establishing a sufficiently large liquid reaction body. Temperature and pressure conditions are thus chosen to minimize volatilization of the liquid medium yet permit vinyl fluoride to evolve. As a corollary, the liquid composition of fluoride salt is chosen to allow the use of adequately high temperature without substantial vaporization thereof.

The following examples illustrate the contemplated manner in which the present invention may be practiced:

EXAMPLE I

The reactor was a vertically disposed 2½ inch inner diameter Teflon tube 24 inches high, having an approximate volume of 1700 cubic centimeters. This reactor was provided with a copper U-shaped heating coil, a cylindrical (½ inch outer diameter and 1⅝ inches long) gas sparger, bottom drain, catalyst addition tube (a 5⁄16 inch outer diameter tube extending downwardly to within 2 inches of the normal liquid level therein) and an exit gas tube. By circulating ice water through the cooling coil during the charging of the reactor it served as a cooling means by which hydrogen fluoride was condensed while during the reaction thermostatically controlled hot water was circulated to heat the reaction medium.

Exit gases leaving the reactor through the exit gas tube were passed through two steel condensers in series and then into pressure letdown system to reduce the pressure of the exit gases to atmospheric (when superatmospheric reaction pressures were used). The gases at atmospheric pressure then were scrubbed through two polyethylene scrubbers each containing 25 weight percent KOH aqueous solution (to remove HF), after which the HF-free gas was passed through a wet test meter, dryer and gas-liquid chromatographic sampling device, a rotameter and then exhausted to a hood.

Using this equipment and mode of operation, vinyl fluoride was prepared from acetylene and hydrogen fluoride. This was accomplished by charging 2.5 moles (322 grams) of quinoline into the nitrogen flushed reactor while circulating ice water through the U-shaped coil until the quinoline was at 5°–10° C. Thereafter, HF was passed into the quinoline through the sparger until about 17.5 moles (350.2 grams) HF had been charged, thus establishing a liquid composition of about 7 moles HF per mole of quinoline.

Catalyst was provided in the form of a solution of diphenyl mercury in quinoline of such diphenyl mercury concentration that a 5 cubic centimeter portion of the solution contained 0.8845 gram of diphenyl mercury (equivalent to 0.5 gram mercury).

Operating under atmospheric pressure with the reactor contents maintained at 70° C. while feeding at least about one mole (sometimes somewhat more, e.g., 1.1 moles) of hydrogen fluoride and one mole of acetylene and periodically adding catalyst solution, the process was operated for 36 hours. Vinyl fluoride in the exit gas stream varied downwardly from 100 percent by volume, depending upon catalyst age, the higher values developing immediately after the addition of catalyst (5 cubic centimeters or about 0.0025 mole diphenyl mercury) during the runs. Catalyst solution was periodically added upon observing that the vinyl fluoride content in the exit gas had decreased usually to about 50 or 60 volume percent. During these operations, the mole ratio of HF to quinoline in the liquid reaction medium varied from between 5.5 and 7 to 1.

The higher HF to quinoline ratios in the liquid were present during those periods when somewhat more than one mole of HF mole of acetylene was being fed to the reactor.

EXAMPLE II

Using the equipment (but no sparger) and general procedure of Example I, the system was operated at 6 pounds per square inch gauge pressure for a 10 hour period, using only an initial catalyst charge of diphenyl mercury, during which time approximately 227 pounds of vinyl fluoride per pound of mercury were attained with conversions of 60 to 80 percent. The HF to quinoline ratio during the run dropped from 7 to 1 down to 6 to 1.

EXAMPLE III

With the equipment and procedure of Example I, 264 pounds of vinyl fluoride per pound of catalyst (mercury basis) were produced over a 12 hour run while feeding at the ratio of 1.10 moles of HF per mole of acetylene. After 5 hours of operation and the vinyl fluoride content in the exit stream had dropped to about 55 percent, the addition of 0.005 mole of catalyst raised the conversion up to nearly 100 percent. During this run, the liquid medium contained from 7 (at the outset) to 6 (at the end) moles HF per mole of quinoline.

EXAMPLE IV

Operating with the equipment and procedure of Example I, but at 12 pounds per square inch gauge pressure, 319 pounds of vinyl fluoride per pound of diphenyl mercury catalyst (mercury basis) were produced over the duration of a 10 hour run while feeding the HF and acetylene in the mole ratio of 1.28 to 1. Throughout most of the run and with only the initial 0.005 mole charge of catalyst, the vinyl fluoride content in the exit gas after scrubbing was substantially 100 percent. During this run, the HF to quinoline ratio in the liquid medium was between 6 and 7 to 1.

EXAMPLE V

Duplicating Example IV but operating at 50° C. and feeding equimolar ratios of HF and acetylene, 199 pounds of vinyl fluoride per pound of catalyst (mercury basis) was prepared.

EXAMPLE VI

Using the apparatus and procedure of Example I, vinyl fluoride was produced over a 30 hour run at the average rate of 440 pounds per pound of catalyst (mercury basis) in a liquid medium under 12 pounds per square inch gauge pressure initially provided by charging 17.5 moles of HF and 2.5 moles of dimethylaniline to the reactor and feeding between 1.1 and 1.33 moles of HF per mole of acetylene.

EXAMPLE VII

Example VI was duplicated but with a medium which at the outset contained 21 moles of HF and 3 moles of dimethylaniline to produce vinyl fluoride.

EXAMPLE VIII

Example VII was essentially duplicated using mercury oxide (HgO) as the catalyst and during a 55 hour run provided 683 pounds of vinyl fluoride per pound of catalyst (mercury basis).

EXAMPLE IX

The procedure and apparatus described in Example I were followed to hydrofluorinate over an 8 hour run methyl acetylene and form 2-fluoropropene at 70° C., charging both diphenyl mercury and mercury oxide (HgO) to provide catalyst in a liquid medium with a mole ratio of HF to dimethylaniline of 6 to 1. Average conversion was about 61 percent.

EXAMPLE X

As in Example IX, methyl acetylene was hydrofluorinated but at 85° C. Slightly higher conversions (about 77 percent) to 2-fluoropropene were obtained.

As demonstrated by Examples IX and X, the present invention is applicable to the hydrofluorination of acetylenically unsaturated compounds, notably alkynes, other than acetylene. As a rule, the hydrofluorination of the acetylenic bond occurs according to Markownikoff's rule (note, methyl acetylene hydrofluorinates primarily to 2-fluoropropene). Thus, in general, lower alkynes and substituted acetylenes such as phenyl acetylene and monochloroacetylene and other 3 to 10 carbon atom compounds may be readily hydrofluorinated.

EXAMPLE XI

Using an all Kel-F reactor, 13 grams (0.1 mole) of quinoline and one gram of the catalyst specified in the following table were charged along with the specified number of moles of hydrogen fluoride by passing into the mixture of quinoline and catalyst the hydrogen fluoride at the temperature specified in the table. Thereafter, addition of acetylene at 70° C. and at the rate of 0.065 mole per hour was commenced. The effluent gas from the reactor was water washed, mixed with carbon dioxide at the rate of 0.015 mole per hour and analyzed by gas chromatography.

Table I lists the various reaction conditions and results:

TABLE I

| Moles HF | Catalyst | Temp., °C. | Mole percent in exit stream | | |
|---|---|---|---|---|---|
| | | | $CO_2$ | $C_2H_2$ | $C_2H_3F$ |
| 0.6 | Diphenyl mercury | 70 | 20.4 | 7.8 | 71.8 |
| 0.9 | do | 30 | 19.7 | 2.9 | 77.4 |
| 0.9 | do | 30 | 19.8 | 2.5 | 77.7 |
| 0.9 | do | 0 | 22.3 | 13.7 | 64.0 |
| 0.9 | Mercurous acetate | 30 | 19.2 | 5.9 | 74.9 |
| 0.9 | Mercuric oxide | 30 | 20.4 | 1.9 | 77.2 |

As demonstrated by the foregoing data, hydrofluorination occurs at 0° C. and as high as 70° C. with varying mole ratios of hydrogen fluoride and quinoline.

EXAMPLE XII

Following the procedure of Example XI and using the conditions indicated in Table II (except that the hydrogen fluoride) was added at room temperature (about 25° C. rather than the normal 70° C. temperature for the hydrogen fluoride addition in Example XI), these results were obtained:

TABLE II

| Moles HF | Catalyst | Temp., °C. | Mole percent products | | |
|---|---|---|---|---|---|
| | | | $CO_2$ | $C_2H_2$ | $C_2H_3F$ |
| 0.9 | Diphenyl mercury | 0 | 20.0 | 71.5 | 8.5 |
| 0.9 | Mercurous trifluoroacetate | 30 | 19.4 | 4.0 | 76.6 |
| 0.9 | Diphenyl mercury | −7 | 32.4 | 8.9 | 58.7 |
| 0.4 | do | 30 | 19.2 | 78.3 | 2.5 |
| 0.4 | do | 70 | 19.0 | 76.1 | 4.9 |
| 1.5 | do | 30 | 22.6 | 5.7 | 70.5 |

EXAMPLE XIII

Using the apparatus described in Example XI except that a Teflon-coated magnetic stirring bar was employed, acetylene at the rate of 0.065 mole per hour and hydrogen fluoride at the rate of 0.1 mole per hour were passed into a liquid mixture provided by one gram of mercury diphenyl, 13 grams of quinoline and 0.3 mole of hydrogen fluoride. The composition of gas leaving the reactor after it had been operating for about 24 hours was 18.9 percent $CO_2$, 26.7 percent $C_2H_2$ and 54.5 percent vinyl fluoride on a molar basis.

EXAMPLE XIV

The procedure and apparatus of Example XIII were followed with the reactor charged with one gram of diphenyl mercury, 0.1 mole of the inorganic fluoride solvent indicated in the table and 0.9 mole of hydrogen fluoride. Table III lists the results:

TABLE III

| Fluoride salts, moles | Mole percent products | | |
|---|---|---|---|
| | $CO_2$ | $C_2H_2$ | $C_2H_3F$ |
| 0.1, $NH_4F$ | 19.9 | 4.0 | 68.0 |
| 0.1, $NaF$ | 19.9 | 21.0 | 59.1 |

EXAMPLE XV

The procedure and equipment of Example XI were following with the exception that 0.1 mole of benzonitrile was used in lieu of quinoline. A gas composition of 20.3 percent $CO_2$, 16.4 percent $C_2H_2$ and 63.3 percent vinyl fluoride on a mole basis was obtained.

EXAMPLE XVI

Following the procedure of Example XI except that in lieu of quinoline the solvent identified in Table IV was employed, one gram of diphenyl mercury was used as catalyst source and the temperature was 30° C. The following results were obtained:

TABLE IV

| Solvent (moles) | HF (moles) | Mole percent of product | | |
|---|---|---|---|---|
| | | $CO_2$ | $C_2H_2$ | $C_2HF_3$ |
| 0.10, diglyme | 1.2 | 22.0 | 40.9 | 34.7 |
| 0.05, di-n-butyl adipate [1] | 0.6 | | 61.0 | 38.6 |
| 0.05, tri-n-heptylamine [1] | 0.45 | | 28.7 | 71.3 |
| 0.10, aniline [1] | 0.9 | | 3.0 | 96.7 |
| 0.20, diethyl phthalate [2] | 0.3 | 22.7 | 43.9 | 33.4 |

[1] No $CO_2$ incorporated.
[2] At 61° C. rather than 30° C.

Using diglyme as the solvent, some 2.4 mole percent ethylidene difluoride was observed in the product gas stream. Small traces of ethylidene difluoride were also observed in the experiments in which di-n-butyl adipate and aniline were employed.

These examples illustrate that a wide variety of bases may be combined with hydrogen fluoride to form the fluoride salt liquid reaction medium employed in performance of this invention. They further demonstrate yields and conversion can be varied by varying the salt and other conditions. Thus, there is considerable latitude in temperature, mole ratio of hydrogen fluoride to base (and hence the composition of the fluoride salt liquid reaction medium), nature of catalyst. Obviously, for each specific reaction composition there are conditions of temperature, catalyst concentration, mole ratio of hydrogen fluoride to fluoride salt, and the like, which are especially useful.

Any of a wide variety of mercury salts or mercury compounds, among which are those which have heretofore been recognized as catalyst for vapor phase reaction of acetylene and hydrogen fluoride, may be charged to the reaction zone. Typical of such mercury compounds include diphenyl mercury, mercuric acetate, mercuric oxide, mercuric fluoride, mercuric nitrate, mercuric oxalate, mercuric oxyfluoride, mercuric sulfate, mercuric sulfide, mercurous acetate, mercurous trifluoroacetate, mercurous fluoride, mercurous nitrate, mercurous oxide, mercurous phosphate, mercurous sulfate and mercurous sulfide. Notwithstanding the particular mercury compound which is charged to the reaction zone, the mercury in the reaction medium is often in the form of either or both of the known mercury fluorides. Mercury fluoride, therefore, may well be the active form of the mercury compound serving as a catalyst for the reaction.

While any of the above enumerated and other mercury compounds can serve to supply catalyst, an important consideration in catalyst compound choice is the selection of one which can be dispersed or dissolved with facility in the liquid medium. Moreover, special expedients to effect the dispersion, solution or reaction into the reaction medium of an otherwise insoluble mercury compounds such as mercuric oxide, are recommended.

Catalyst concentrations are variable. As a rule, the catalyst concentration provided by charging between 0.01 and 2.0 percent or higher by weight (as mercury) of the mercury compound to the reaction medium is appropriate. Higher concentrations are also operable. During continuous operation, mercury catalyst content of the reaction medium may be supplemented by periodic or continuous addition of further amounts of the mercury compound. Usually, this addition is conducted so as to overcome any decline in conversion of acetylene.

Considerable latitude in the moles of HF per mole of fluoride salt (or base which combine with the fluoride to form the salt) in providing the liquid reaction medium is feasible without departing from the spirit of this invention. Again, depending upon the base (or fluoride salt), temperature conditions and the like, the particular mole ratio of hydrogen fluoride to base which is employed in forming the reaction medium will have a bearing upon the conversion and yield of vinyl fluoride. For example, at 70° C. and 12 pounds per square inch gauge, a reaction medium of about 6 moles of HF per mole of quinoline is especially suitable. At lower ratios of hydrogen fluoride, conversion and yields are less unless higher concentrations of catalyst or higher temperatures are relied upon. As the mole ratio of hydrogen fluoride to quinoline greatly exceeds 10, evidence indicates the amount of ethylidene difluoride which is produced increases. With dimethylaniline as the base, a recommended liquid reaction medium useful at 70° C. and 12 pounds per square inch gauge should contain about 5 moles of HF per mole of the amine.

The ratio of HF to organic base is maintained between 3 and 12 moles of HF to base (such as quinoline), the reaction temperature kept between 45° and 80° C., the feed rate of HF to acetylene is such that the reaction medium's HF to base ratio once set varies but a little (usually involves feeding more than one but rarely more than 2 moles of HF per mole of acetylene) and reliance upon 0.5 to 10 or somewhat higher atmospheres pressure above atmospheric provides especially suitable conditions for continuous operation.

While the present invention has been described by reference to specific details of certain embodiments, it is not intended that the invention be construed as limited to such details except insofar as they appear in the appended claims.

What is claimed is:

1. A method of catalytically hydrofluorinating a 2 to 10 carbon compound selected from the group consisting of 2 to 10 carbon alkynes, phenyl acetylene and monochloroacetylene which comprises catalytically reacting equimolar proportions of the compound and hydrogen fluoride in a liquid reaction medium comprising a liquid composition of hydrogen fluoride and a fluoride salt selected from the group consisting of quinoline hydrofluoride, dimethylaniline hydrofluoride and alkali metal fluorides which medium also contains a mercury compound catalyst to form the olefinically unsaturated fluoride equimolar hydrofluorination product of the compound in the liquid reaction medium and evolving said product as a gas from the liquid reaction medium.

2. The method of claim 1, wherein the compound is acetylene or methyl acetylene.

3. A method of catalytically producing vinyl fluoride from acetylene and hydrogen fluoride which comprises reacting equimolar proportions of acetylene and hydrogen fluoride in a liquid reaction medium containing a mercury compound catalyst and comprised of a liquid mixture of a fluoride salt selected from the group consisting of quinoline hydrofluoride, dimethylaniline hydrofluoride and alkali metal fluorides with hydrogen fluoride while maintaining the liquid reaction medium under conditions of temperature and pressure at which vinyl fluoride is gaseous and evolving vinyl fluoride as a gas from the reaction medium.

4. The method of claim 3, wherein the salt is sodium fluoride, lithium fluoride, potassium fluoride or ammonium fluoride.

5. A method of catalytically forming an olefinically unsaturated fluoride by equimolar reaction of a 2 to 10 carbon alkyne and hydrogen fluoride which comprises conducting the reaction in a mercury fluoride containing liquid reaction medium consisting essentially of a liquid composition of fluoride salt and hydrogen fluoride, said salt being selected from the group consisting of quinoline hydrofluoride, dimethylaniline hydrofluoride and alkali metal fluorides.

6. The method of claim 5 wherein the alkyne is acetylene and the olefinically unsaturated fluoride is vinyl fluoride.

7. A method of catalytically hydrofluorinating a 2 to 10 carbon compound selected from the group consisting of 2 to 10 carbon alkynes, phenyl acetylene and monochloroacetylene which comprises catalytically reacting equimolar proportions of the compound and hydrogen fluoride in a liquid medium comprising a liquid composition of hydrogen fluoride and a fluoride salt selected from the group consisting of quinoline hydrofluoride, dimethylaniline hydrofluoride and alkali metal fluorides which medium contains mercury fluoride catalyst to form the olefinically unsaturated fluoride equimolar hydrofluorination product of the compound in the liquid reaction medium and evolving said product as a gas from the liquid reaction medium.

References Cited

UNITED STATES PATENTS 2,425,991    8/1947    Burk et al. _____ 260—653.6

DANIEL D. HORWITZ, Primary Examiner

U.S. Cl. X.R.

260—653.4